(12) United States Patent
Otsuka

(10) Patent No.: US 9,530,021 B2
(45) Date of Patent: Dec. 27, 2016

(54) PORTABLE RECORDING MEDIUM, SYSTEM INCLUDING THE PORTABLE RECORDING MEDIUM, AND DATA RECOVERY METHOD OF THE PORTABLE RECORDING MEDIUM

(71) Applicant: PANASONIC CORPORATION, Osaka (JP)

(72) Inventor: Takeshi Otsuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 280 days.

(21) Appl. No.: 14/081,958

(22) Filed: Nov. 15, 2013

(65) Prior Publication Data

US 2014/0258735 A1    Sep. 11, 2014

(30) Foreign Application Priority Data

Mar. 7, 2013   (JP) .................................. 2013-044973
Aug. 29, 2013  (JP) .................................. 2013-177634

(51) Int. Cl.
G06F 12/14    (2006.01)
G06F 21/62    (2013.01)
G06F 21/74    (2013.01)

(52) U.S. Cl.
CPC ........... *G06F 21/6218* (2013.01); *G06F 21/74* (2013.01)

(58) Field of Classification Search
CPC ................. G06F 21/31; G06F 12/1466; G06F 2221/2107; G06F 17/30091; G06F 21/60–21/6218; G06F 12/1408; G06F 11/2094; G06F 11/1666; G06F 2212/202; G06F 2212/222; G06F 2212/2113; G06F 2212/2147; G06F 3/0622; G06F 3/068; H04L 63/0428; H04L 9/3226; H04L 9/0863; H04L 9/083; H04L 63/083; G11B 20/0021; H04W 12/06
(Continued)

(56) References Cited

U.S. PATENT DOCUMENTS 5,282,247 A  *  1/1994  McLean .................. G06F 21/78
                                                          711/164
2007/0113078 A1*  5/2007  Witt ....................... G06F 21/602
                                                          713/165
(Continued)

OTHER PUBLICATIONS

Lexar (2005).Lexar Launches Special Introductory Offer for Free Engraving of New JumpDrive ® Lightning, Retrieved Jan. 7, 2015 from http://www.lexar.com/about/newsroom/press-releases/lexar-launches-special-introductory-offer-free-engraving-new-jumprive.*

*Primary Examiner* — Brian Shaw
(74) *Attorney, Agent, or Firm* — McDermott Will & Emery LLP

(57) ABSTRACT

A technique of the present invention includes a storage section for storing contents data and an encryption flag indicating that any one of an encryption recording mode and a non-encryption recording mode is set, an encrypting engine for encrypting contents data using an encryption key when the encryption recording mode is set, and a control section for controlling a storage section so that the encryption key and the encrypted contents data are stored when the encryption recording mode is set. Further, when the setting is changed from the encryption recording mode into the non-encryption recording mode, the control section controls the storage section so that the encryption flag is changed to indicate the setting of the non-encryption recording mode with the continuous storage of the encryption key.

11 Claims, 14 Drawing Sheets

(58) Field of Classification Search
USPC ... 726/2, 4, 5, 26, 19, 27, 29; 713/193, 165, 713/189; 711/163; 707/694
See application file for complete search history.

(56) References Cited

U.S. PATENT DOCUMENTS

| | | | |
|---|---|---|---|
| 2007/0192840 A1* | 8/2007 | Pesonen | G06F 21/31 726/5 |
| 2008/0065905 A1 | 3/2008 | Salessi | |
| 2013/0191636 A1* | 7/2013 | Aramaki | G06F 21/44 713/168 |

* cited by examiner

FIG. 5
| Function ID | Name of function |
|---|---|
| 00000001 | Set encrypted password (F1) |
| 00000010 | Clear encrypted password (F2) |
| others | Reserved |
FIG. 6A
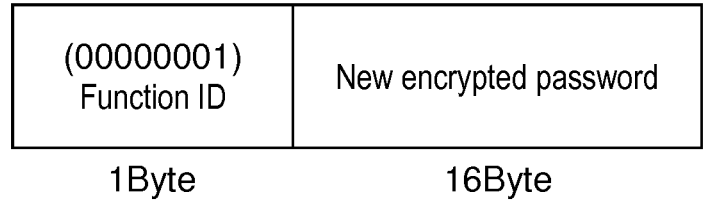
1Byte   16Byte
FIG. 6B
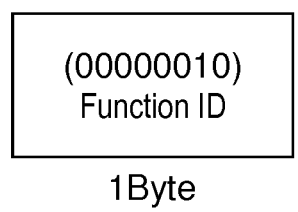
1Byte

FIG. 10

| Function ID | Name of function |
|---|---|
| 00000001 | Set encrypted password (F1) |
| 00000010 | Clear encrypted password (F2) |
| 00000100 | Change encrypted password (F3) |
| others | Reserved |

PORTABLE RECORDING MEDIUM, SYSTEM INCLUDING THE PORTABLE RECORDING MEDIUM, AND DATA RECOVERY METHOD OF THE PORTABLE RECORDING MEDIUM

BACKGROUND OF THE INVENTION

1. Field of the Invention

The present invention relates to a portable recording medium in which encrypted contents data is stored, a system including the portable recording medium, and a data recovery method of the portable recording medium.

2. Description of the Related Art

The U.S. Patent Publication No. 2008/0065905 discloses a storage device. The storage device includes an interface for connection with a host, a storage medium, and an encrypting engine. When the storage device receives a writing command from a host, it encrypts data using the encrypting engine. The storage device stores the encrypted data in the storage medium. On the other hand, when the storage device receives a reading command, it decodes the data stored in the storage medium. The storage device notifies the host of the decoded data.

SUMMARY OF THE INVENTION

A portable recording medium of the present invention includes an interface, a storage section, an encrypting engine, and a control section. The interface accepts setting of into any one of an encryption recording mode for encrypting and recording contents data and a non-encryption recording mode for non-encrypting and recording contents data. The storage section stores contents data, and an encryption flag that indicates whether the encryption recording mode or the non-encryption recording mode is set. When the encryption recording mode is set, the encrypting engine encrypts contents data using an encryption key. When the encryption recording mode is set, the control section controls the storage section so that the encryption key and the encrypted contents data are stored. Further, when the setting is changed from the encryption recording mode into the non-encryption recording mode, the control section controls the storage section so that the encryption flag is changed to indicate the setting of the non-encryption recording mode with the continuous storage of the encryption key.

Further, a system including the portable recording medium of the present invention has the portable recording medium, a control device to which the portable recording medium is attachable. The control device included in the system including the portable recording medium of the present invention has an interface on a side of the control device. The interface on the side of the control device notifies the portable recording medium of an instructing signal for setting the portable recording medium into any one of the encryption recording mode for encrypting and recording contents data and the non-encryption recording mode for non-encrypting and recording contents data. The portable recording medium included in the system including the portable recording medium of the present invention has an interface on a side of a recording medium, a storage section on the side of the recording medium, an encrypting engine, and a control section. The interface on the side of the recording medium accepts an instruction for setting any one of the encryption recording mode for encrypting and recording contents data and the non-encryption recording mode for recording contents data as a plain text via an interface on the side of the control device. The storage section on the side of the recording medium stores contents data, and an encryption flag indicating whether the encryption recording mode or the non-encryption recording mode is set. When the encryption recording mode is set, the encrypting engine encrypts contents data using an encryption key. When the encryption recording mode is set, the control section controls the storage section on the side of the recording medium so that the encryption key and the encrypted contents data are stored. Further, when the interface on the side of the recording medium accepts a signal indicating an instruction for changing the encryption recording mode into the non-encryption recording mode via the interface on the side of the control device, the control section controls the storage section on the side of the recording medium so that the encryption flag is changed to indicate that the non-encryption recording mode is set with the continuous storage of the encryption key.

Further, a data recovery method for the portable recording medium of the present invention, the portable recording medium storing an encryption flag indicating that any one of the encryption recording mode for encrypting and recording contents data and the non-encryption recording mode for non-encrypting and recording contents data is set, an encryption key, and contents data encrypted by using the encryption key, the data recovery method for changing the encryption flag so that the encryption flag indicates that the portable recording medium whose encryption flag indicates that the non-encryption recording mode is set into the encryption recording mode. The data recovery method for the portable recording medium of the present invention decodes the contents data encrypted by using the encryption key in the portable recording medium in which the encryption flag is changed so as to indicate that the encryption recording mode is set.

BRIEF DESCRIPTION OF DRAWINGS

FIG. 5 is a chart for describing types of commands for changing setting of an encrypted password in the memory card according to the first embodiment;

FIG. 6A is a pattern diagram for describing a command constitution for changing the setting of encrypted password in the memory card according to the first embodiment;

FIG. 6B is a pattern diagram for describing a command constitution for changing the setting of encrypted password in the memory card according to the first embodiment;

FIG. 10 is a chart for describing types of commands for changing setting of an encrypted password in the memory card according to a second embodiment;

DETAILED DESCRIPTION OF THE PREFERRED EMBODIMENTS

Figure 1:
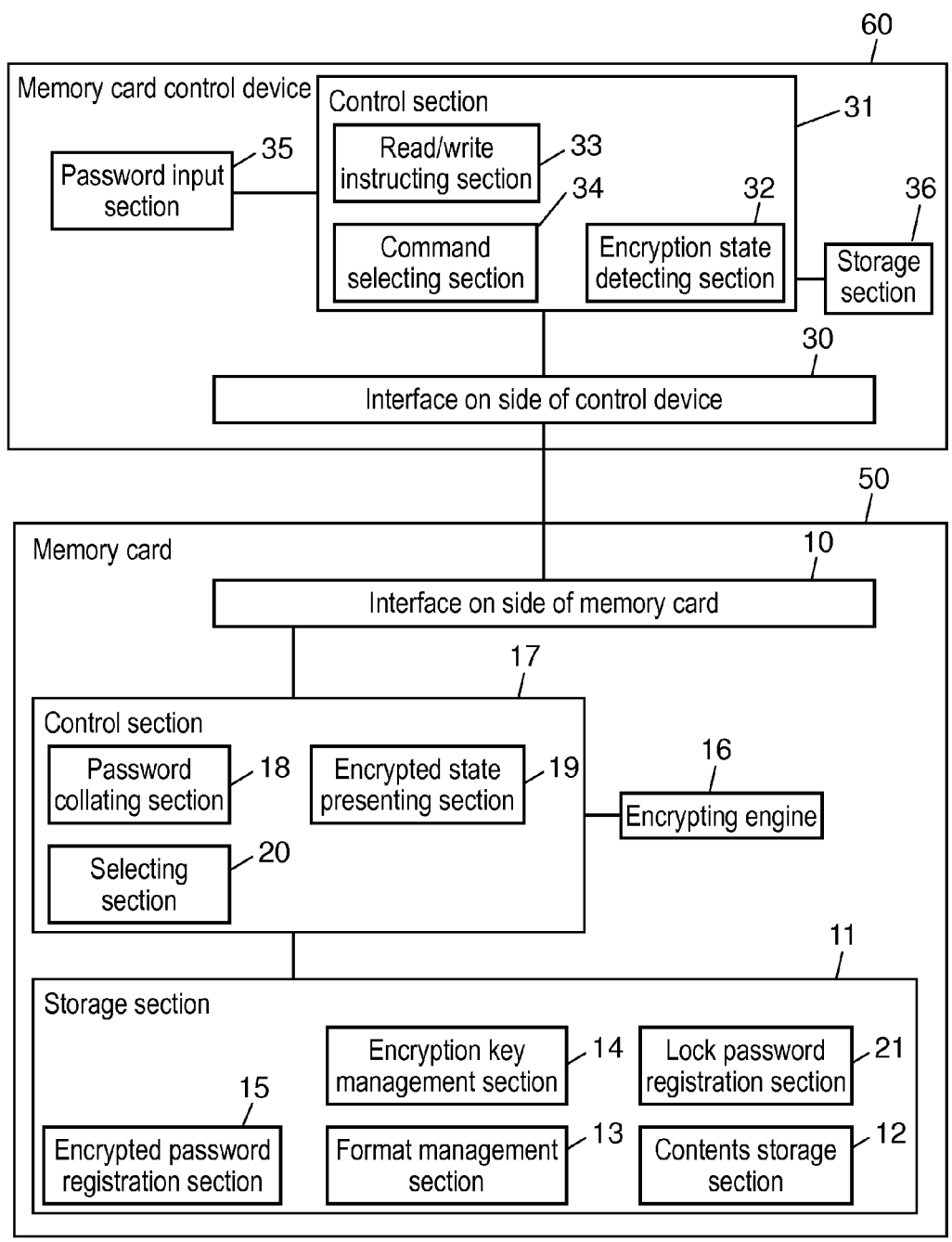
FIG. 1 is a block diagram illustrating an entire system according to a first embodiment.

Embodiments are described in detail below suitably with reference to the drawings. Description that is more detailed than necessity is occasionally omitted. For example, detailed description about already-known items and overlapped description about the substantially same constitution are occasionally omitted. This is for avoiding the following description from being unnecessarily redundant and for making understanding of people skilled in the art easy.

The inventor(s) provides the accompanying drawings and the following description in order to make people skilled in the art sufficiently understand the present invention, and does not intend that they limit a main subject described in claims.

First Exemplary Embodiment

A first embodiment is described below with reference to FIGS. 1 to 7.

1-1. Outline

Memory card 50 according to the embodiment is set into any one of an encryption recording mode and a non-encryption recording mode. The encryption recording mode is a mode for encrypting contents data whose recording request is accepted from an external device using an encryption key and storing the encrypted contents data. When memory card 50 is set into the encryption recording mode, a user should notify memory card 50 of and the encrypted password linked to the encryption key in order to store the contents data into memory card 50. After receiving the notification about the proper encrypted password, memory card 50 encrypts the contents data whose recording request is accepted. Concretely, the user should input the encrypted password via an external device to which memory card 50 is attached. On the other hand, the non-encryption recording mode is a mode for non-encrypting and storing the contents data whose recording request is accepted from the external device.

As usage conditions of a portable storage medium such as memory card 50 that can be set into two modes including the encryption recording mode and the non-encryption recording mode, the following conditions are considered. For example, it is assumed that a certain user sets memory card 50 into the encryption recording mode and uses it. In such a case, the user of memory card 50 occasionally lends memory card 50 to another user. In order that another user who borrows memory card 50 allows the contents data to be stored, this user should input an encrypted password into memory card 50 via the external device to which memory card 50 is attached. That is to say, when the user who owns memory card 50 lends memory card 50 to another user, the user should let another user know the encrypted password.

However, it is not preferable from a security view to let another user know the encrypted password. This is because a situation that another user who gets the encrypted password uses the encrypted password for a wrong purpose is considered. Further, a situation that another user who gets the encrypted password leaks the encrypted password to another person is considered.

In order to avoid such a situation, when lending memory card 50 to another user, the user of memory card 50 can change the setting of memory card 50 from the encryption recording mode into the non-encryption recording mode. When the setting of memory card 50 is changed into the non-encryption recording mode, the user of memory card 50 can allow another user to use memory card 50 without letting the encrypted password to be known to another user. That is to say, when borrowing memory card 50 whose setting is changed into the non-encryption recording mode, the user who borrows memory card 50 can store contents data into memory card 50 without particularly inputting an encrypted password.

Suppose the case that, a determination is made whether memory card 50 is set into the encryption recording mode or the non-encryption recording mode in such a manner that an external device determines whether an encryption key is set in memory card 50. In such a case, when the setting of memory card 50 is changed from the encryption recording mode into the non-encryption recording mode, memory card 50 deletes a stored encryption key. This is because when the encryption key remains stored, memory card 50 is kept set to the encryption recording mode. Therefore, in this case, even if the user desires to recover encrypted data stored when the encryption recording mode is set in memory card 50, after the setting is changed into the non-encryption recording mode, memory card 50 cannot recover the encrypted data. This is because the encryption key is already deleted and thus memory card 50 cannot decode the encrypted data.

Therefore, memory card 50 of the present invention has an interface 10, storage section 11, encrypting engine 16, and control section 17, described later. The interface 10 accepts an instruction for setting memory card 50 into any one of the encryption recording mode for encrypting and recording contents data and the non-encryption recording mode for non-encrypting and recording contents data. Storage section 11 stores the contents data, and an encryption flag indicating whether memory card 50 is set to any one of the encryption recording mode and the non-encryption recording mode. When memory card 50 is set into the encryption recording mode, encrypting engine 16 encrypts the contents data using an encryption key. When memory card 50 is set into the encryption recording mode, control section 17 controls storage section 11 so that the encryption key and the encrypted contents data are stored. Further, when the setting of memory card 50 is changed from the encryption recording mode into the non-encryption recording mode, control section 17 controls storage section 11 so that the encryption flag is changed to indicates that the non-encryption recording mode is set with the continuous storage of the encryption key.

As a result, even when memory card 50 of the present invention is changed from the setting for encrypting and recording data into the setting for non-encrypting and recording data, thereafter memory card 50 can recover the encrypted data comparatively easily. This is because even when the setting is changed from the encryption recording mode into the non-encryption recording mode, memory card 50 continues to store the encryption key at a time when the encryption recording mode is set.

Memory card 50, the system including memory card 50, and the data recovery method for memory card 50 are described in detail below.

1-2. Constitution of the System Including Memory Card 50

A constitution of the system including memory card 50 is described with reference to FIG. 1. FIG. 1 is a block diagram illustrating the constitution of the system including memory card 50.

The system according to this embodiment is composed of memory card 50 and memory card control device 60. Memory card 50 is a recording medium in which data is stored. Memory card 50 is, as described above, set into any one of the encryption recording mode and the non-encryption recording mode. Memory card control device 60 is a control device for notifying memory card 50 of commands such as data recording and reading instructions so as to control memory card 50. Memory card control device 60 makes a switch as to whether an encryption command composed of encryption reading command and encryption writing command is transmitted to memory card 50 or a non-encryption command composed of a non-encryption reading command and a non-encryption writing command is transmitted to memory card 50 according to the setting of memory card 50 into the encryption recording mode or the non-encryption recording mode. Memory card control device 60 is, for example, business-oriented video cameras, consumer digital still cameras, consumer digital video cameras, an adapter that is attached to business-oriented video cameras, and a recovery device, described later, for recovering data to be stored in memory card 50. Memory card control device 60 notifies memory card 50 of an instruction for recording shot moving image data or notifies memory card 50 of an instruction for reading moving image data stored in memory card 50. Details of memory card 50 and memory card control device 60 are described below.

Memory card 50 has interface 10, storage section 11, encrypting engine 16, and control section 17. Memory card 50 receives commands such as an encryption command and non-encryption command, and contents data from memory card control device 60 via interface 10. When memory card 50 is set into the encryption recording mode, contents data that is received together with the encryption writing command is encrypted by encrypting engine 16, and then the encrypted contents data is stored in storage section 11. Further, when memory card 50 is set into the encryption recording mode, the encrypted contents data is read from storage section 11 according to the reception of the encryption reading command, and the read encrypted contents data is decoded by encrypting engine 16. Thereafter, the decoded contents data is transmitted to memory card control device 60 via interface 10.

On the other hand, when memory card 50 is set into the non-encryption recording mode, contents data that is received together with a non-encryption writing command is not encrypted and is stored in storage section 11. When memory card 50 is set into the non-encryption recording mode, contents data that is not encrypted is read from storage section 11 according to reception of a non-encryption reading command, and the read contents data is transmitted to memory card control device 60 via interface 10. Each block composing memory card 50 is described below.

The interface 10 is for connection with memory card control device 60. The interface 10 receives commands such as the encryption command and the non-encryption command, an encrypted password and contents data from memory card control device 60. Further, interface 10 accepts an instruction for setting memory card 50 into any one of the encryption recording mode for encrypting and recording contents data and the non-encryption recording mode for non-encrypting and recording contents data.

Storage section 11 is a storage medium for storing data. For example, storage section 11 is composed of a flash memory. Storage section 11 has contents storage section 12, format management section 13, encryption key management section 14, encrypted password registration section 15 and lock password registration section 21 as storage regions. Contents storage section 12 is a region where contents data such as moving image data, still image data, and document data are stored. Format management section 13 is a region where the encryption flag indicating whether memory card 50 is set into the encryption recording mode or the non-encryption recording mode is stored. For example, when memory card 50 is set into the encryption recording mode, "1" is stored as the encryption flag in the format management section 13, and when memory card 50 is set into the non-encryption recording mode, "0" is stored as the encryption flag therein.

Encryption key management section 14 is a region where an encryption key generated by control section 17 is stored when memory card 50 is set into the encryption recording mode. Encrypted password registration section 15 is a region where an encrypted password related to the generated encryption key is stored when memory card 50 is set into the encryption recording mode. The encrypted password is stored in encrypted password registration section 15 by user's setting when memory card 50 is set into the encryption recording mode. The encryption key is generated randomly by control section 17 based on the encrypted password input by the user, and is stored in encryption key management section 14. The encryption key is, for example, 128-bit random numbers. The encryption keys stored in encryption key management section 14 are one-to-one-related to the encrypted passwords stored in encrypted password registration section 15. The lock password registration section 21 is a region in which a lock password is stored. The lock password is a password that limits writing and reading of data into/from memory card 50. When the lock password is set, memory card 50 does not permit the writing and reading of data until the lock password is decrypted.

Encrypting engine 16 is a data processing engine for encrypting contents data and decoding encrypted contents data. For example, encrypting engine 16 is composed of a semiconductor chip. A program for encrypting data, and a program for decoding encrypted data are incorporated into encrypting engine 16. Encrypting engine 16 encrypts contents data or decodes encrypted contents data using the encryption keys stored in encryption key management section 14.

Control section 17 is a controller for entirely controlling memory card 50. For example, control section 17 is composed of a semiconductor chip. Control section 17 has password collation section 18, encryption state presenting section 19, and selecting section 20 as a function block. Password collation section 18 is a block for determining whether an encrypted password received from memory card control device 60 via interface 10 matches with an encrypted password stored in encrypted password registration section 15. Encryption state presenting section 19 is a block for outputting the encryption flag stored in format management section 13 to memory card control device 60 via interface 10.

Selecting section 20 is a block for determining whether the received contents data is encrypted by encrypting engine 16 and is stored in contents storage section 12 or the received contents data is not encrypted and is stored in contents storage section 12 according to reception of the encryption writing command or the non-encryption writing command from memory card control device 60. Further, selecting section 20 is a block for determining whether the encrypted contents data stored in contents storage section 12 is decoded according to the reception of the encryption reading command or the non-encryption reading command from memory card control device 60, and is transmitted to memory card control device 60 via interface 10 or the unencrypted contents data stored in contents storage section 12 is not decoded and is transmitted to memory card control device 60 via interface 10.

Memory card control device 60 is described below. Memory card control device 60 has interface 30, control section 31, password input section 35, and storage section 36. Memory card control device 60 requests memory card 50 to transmit the encryption flag via interface 30, and allows the encryption flag received from memory card 50 to be stored in storage section 36. Memory card control device 60 transmits the encryption command or the non-encryption command to memory card 50 according to a state whether the encryption flag in memory card 50 indicates the encryption recording mode or the non-encryption recording mode. When the encryption flag in memory card 50 indicates the encryption recording mode, memory card control device 60 urges the user to input an encrypted password via password input section 35, and transmits the input encrypted password to memory card 50. When matching of the transmitted encrypted password with the encrypted password stored in memory card 50 is received from memory card 50, memory card control device 60 transmits the encryption command to memory card 50 via interface 30 as the need arises. Each block composing memory card control device 60 is described below.

Interface 30 is for connection with memory card 50. Interface 30 transmits commands such as the encryption command and the non-encryption command, encrypted passwords, and contents data to memory card 50. Further, interface 30 transmits an instruction for setting memory card 50 into any one of the encryption recording mode for encrypting and recording contents data and the non-encryption recording mode for non-encrypting and recording contents data.

Control section 31 is a controller for entirely controlling memory card control device 60. For example, control section 31 is composed of a semiconductor chip. Control section 31 has encryption state detecting section 32, reading/writing instruction section 33, and command selecting section 34 as a function block. Encryption state detecting section 32 is a block for requesting memory card 50 to transmit the encryption flag. When encryption state detecting section 32 receives the encryption flag from memory card 50 as the need arises, it determines whether the received encryption flag indicates the encryption recording mode or the non-encryption recording mode. Reading/writing instruction section 33 is a block where sector numbers and a number of sectors in memory card 50 in or from which contents data is stored or read are specified. Command selecting section 34 is a block where a determination is made based on a determined result of encryption state detecting section 32 whether the encryption command or the non-encryption command is issued. Further, command selecting section 34 is a block where the encryption command or the non-encryption command is issued based on the instruction from reading/writing instruction section 33 so as to be a command for specifying the sector numbers and the number of sectors in memory card 50 in which contents data is stored.

Password input section 35 is an input interface for accepting input of encrypted passwords from the user. Password input section 35 is composed of a software keyboard displayed on a touch panel, for example. The encrypted password input via password input section 35 is transmitted to memory card 50 via interface 30.

Storage section 36 is an internal storage medium in which an encrypted password input via password input section 35, an encryption flag received from memory card 50, and a lock password input in advance are stored. For example, storage section 36 is composed of a flash memory. The lock password is a password to be certificated by a lock password set in memory card 50. Therefore, when a lock password is set in memory card 50 and the lock password is not stored in storage section 36, memory card control device 60 cannot write nor read data into or from memory card 50.

1-3. Operation

An operation of the system including memory card 50 and an operation for recovering encrypted data in memory card 50 are described with reference to FIGS. 2 to 7.

1-3-1. Initial Operation

Figure 2:
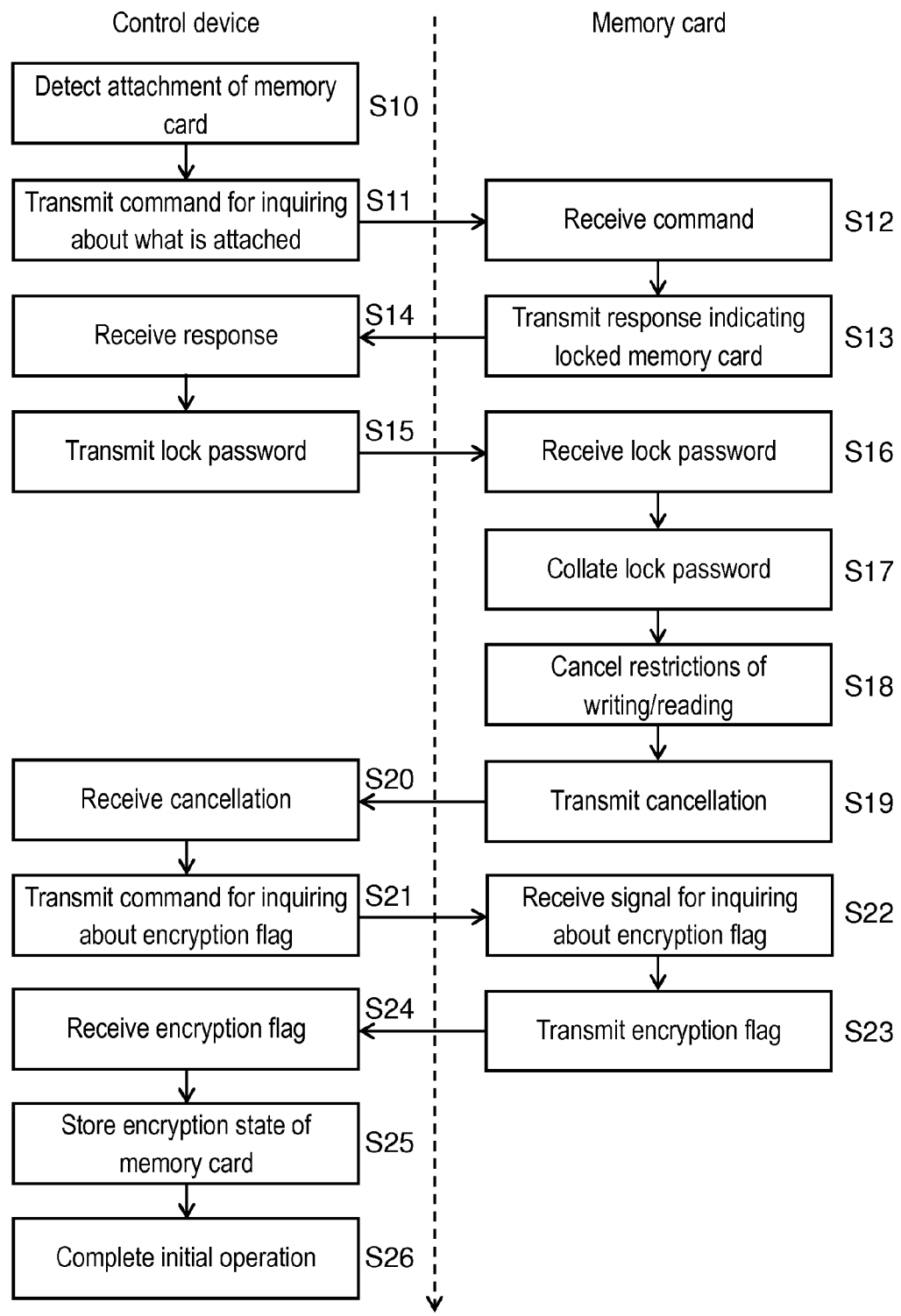
FIG. 2 a flowchart for describing an initial operation in the first embodiment.

When memory card 50 is attached, memory card control device 60 automatically starts an initial operation. Memory card control device 60 and memory card 50 authenticate each other through the initial operation, and determine whether writing and reading of data is permitted. The initial operation in the system including memory card 50 is described with reference to FIG. 2. FIG. 2 is a flowchart for describing the initial operation in the system including memory card 50.

When memory card 50 is attached to memory card control device 60, control section 31 detects the attachment of memory card 50 via interface 30 (S10). When the attachment of memory card 50 is detected, control section 31 transmits a type inquiry command for inquiring of a type of a device attached to interface 30 to memory card 50 via interface 30 (S11).

When the type inquiry command is received via interface 10 (S12), control section 17 refers to lock information stored in a region, not shown, in storage section 11. As a result of the reference, when the determination is made that memory card 50 is set into a lock state that the writing of data into memory card 50 and the reading of data from memory card 50 is prohibited, control section 17 transmits a response indicating that memory card 50 is set into the lock state to memory card control device 60 via interface 10 (S13). The lock information is information indicating that memory card 50 is set into the lock state or into an unlock state that the writing of data into memory card 50 and reading of data from memory card 50 are permitted.

When the response is received via interface 30 (S14), control section 31 reads the lock password stored in storage section 36, and transmits the read lock password into memory card 50 via interface (S15). When the lock password is received (S16), password collation section 18 in control section 17 collates the received lock password with the lock password stored in the lock password registration section 21 (S17).

As a result of the collation, when the received lock password matches with the lock password stored in the lock password registration section 21, control section 17 changes the lock information stored in storage section 11 into information indicating that memory card 50 is set into the unlock state (S18). That is to say, control section 17 cancels restrictions on the writing of data into memory card 50 and the reading of data from memory card 50 (S18). When supply of power to memory card 50 is turned OFF, a state of memory card 50 again shifts to the lock state.

When the restrictions are canceled, control section 17 transmits a response indicating the cancellation of the restrictions to memory card control device 60 via interface 10 (S19).

When the response is received via interface 30 (S20), control section 31 allows a state that the setting of memory card 50 is changed into the unlock state to be stored in storage section 36, and transmits flag inquiry command for inquiring the encryption flag stored in memory card 50 to memory card 50 via interface 30 (S21).

When the flag inquiry command is received via interface 10 (S22), the encryption state presenting section 19 of control section 17 reads the encryption flag stored in format management section 13 of storage section 11, and transmits the read encryption flag to memory card control device 60 via interface 10 (S23).

When the encryption flag is received via interface 30 (S24), control section 31 allows the received encryption flag to be stored in storage section 36 (S25). As a result, memory card 50 and memory card control device 60 completes the initial operation (S26).

Even when writing command and reading command of data are received from memory card control device 60 at step S18 until the lock state is canceled, memory card 50 does not permit the writing and reading of data. Therefore, when the encryption recording mode is set, memory card 50 does not permit requests for writing and reading of data from memory card control device 60 until a proper lock password is transmitted from memory card control device 60. As a result, even if an external device that cannot recognize that the encrypted contents data is stored in memory card 50 transmits a contents data reading command to memory card 50, the encrypted contents data is not read into the external device. This can obviate an out-of-control situation such that the external device treats encrypted contents data and encrypted FAT data as unencrypted contents data and unencrypted FAT data.

1-3-2. Non-Encryption Recording/Reproducing Operation

Figure 3:
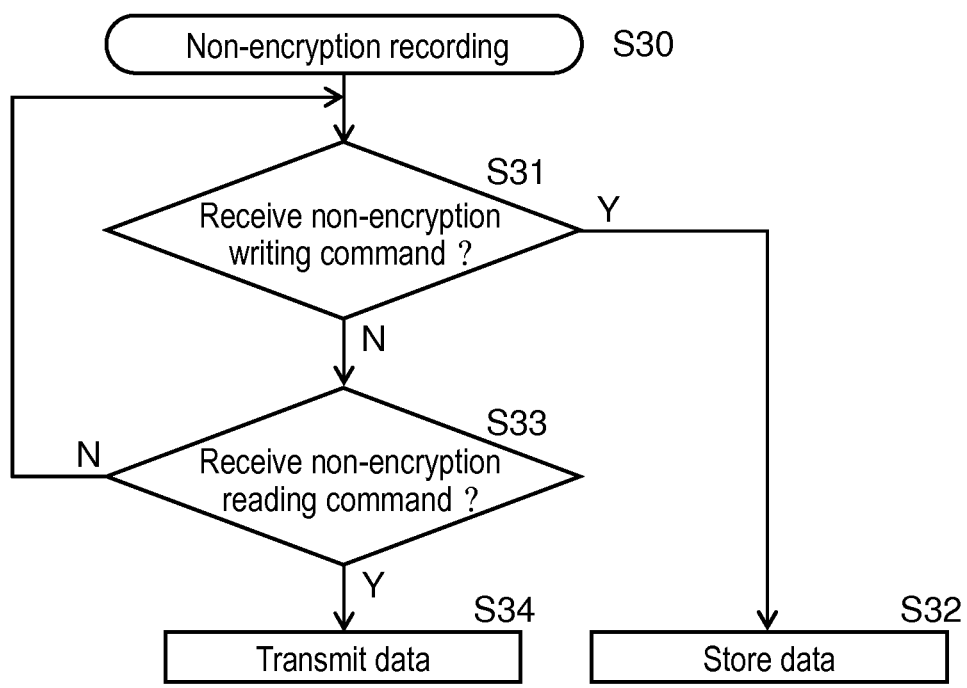
FIG. 3 is a flowchart for describing an operation for recording/reproducing data in a case where a memory card is set into a non-encryption recording mode according to the first embodiment.

The operation for recording/reproducing contents data by the system including memory card 50 in the case where memory card 50 is set into the non-encryption recording mode is described with reference to FIG. 3. FIG. 3 is a flowchart for describing the data recording/reproducing operation in the case where memory card 50 is set into the non-encryption recording mode.

When the non-encryption recording mode is set (S30), selecting section 20 of control section 17 determines whether non-encryption writing command is received from memory card control device 60 (S31). When the determination is made that the non-encryption writing command is received, selecting section 20 of control section 17 does not encrypt contents data received together with the non-encryption writing command and allows the contents data to be stored in the contents storage section 12 of storage section 11 (S32).

On the other hand, the determination is made at step S31 that the non-encryption writing command is not received, selecting section 20 of control section 17 determines whether the non-encryption reading command is received from memory card control device 60 (S33). When the determination is made that the non-encryption reading command is received, selecting section 20 of control section 17 reads target contents data from a region on contents storage section 12 indicated by the non-encryption reading command, and transmits the read unencrypted contents data to memory card control device 60 (S34).

1-3-3. Encryption Recording/Reproducing Operation

Figure 4:
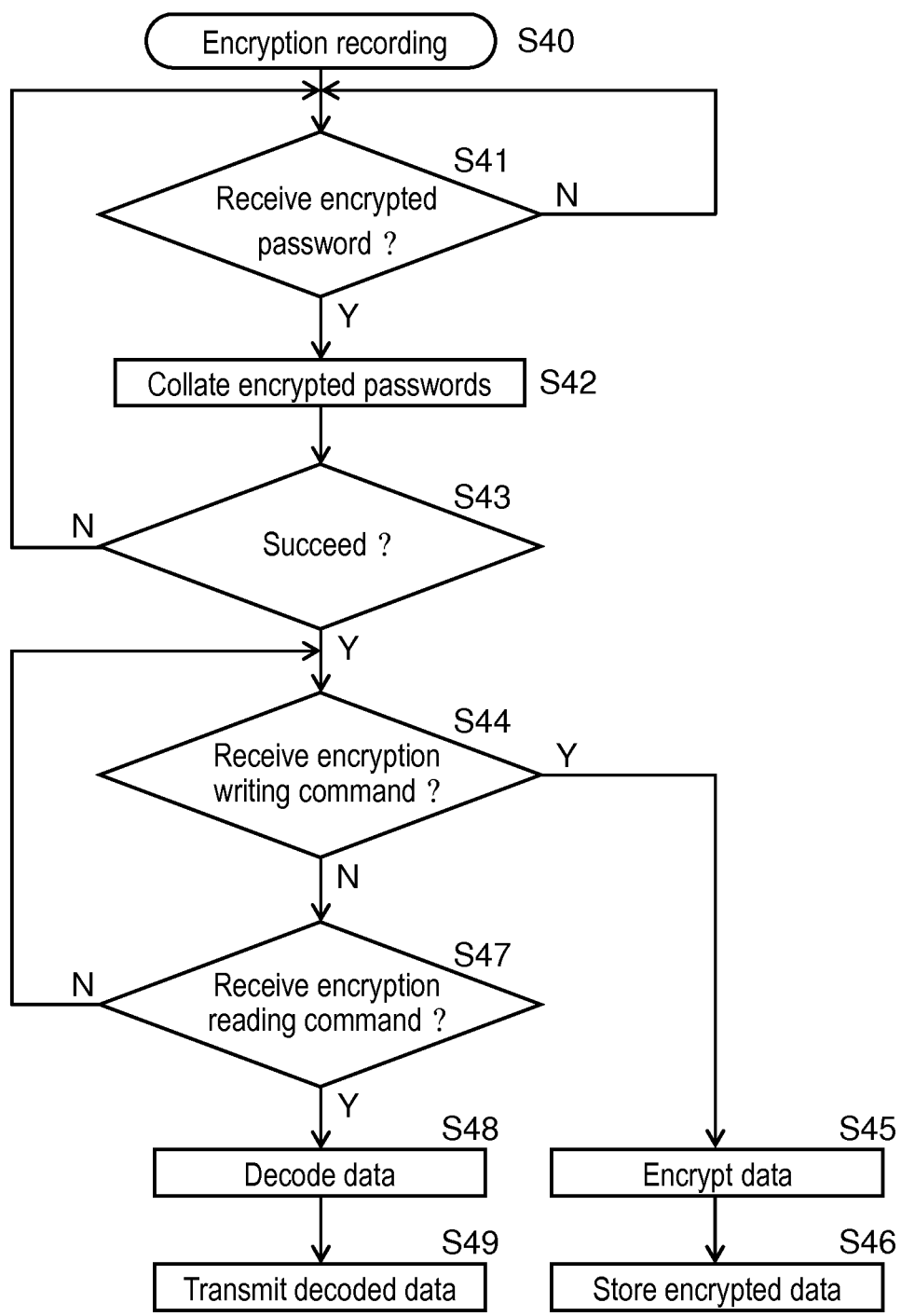
FIG. 4 is a flowchart for describing the operation for recording/reproducing data in a case where the memory card is set into an encryption recording mode according to the first embodiment.

The operation for recording/reproducing contents data by the system including memory card 50 in the case where memory card 50 is set into the encryption recording mode is described with reference to FIG. 4. FIG. 4 is a flowchart for describing the data recording/reproducing operation in the case where memory card 50 is set into the encryption recording mode.

When the encryption recording mode is set (S40), control section 17 stands by until encrypted password is received from memory card control device 60 (S41). When the encrypted password is received, password collation section 18 of control section 17 reads the encrypted password stored in encrypted password registration section 15 of storage section 11, and collates the encrypted password received from memory card control device 60 with encrypted password read from the storage section 11 (S42).

When the collation of the encrypted passwords succeeds (S43), control section 17 determines whether the encryption writing command is received from memory card control device 60 (S44). When the determination is made that the encryption writing command is received, selecting section 20 of control section 17 makes encrypting engine 16 encrypt the contents data received together with the encryption writing command (S45). When the encryption of the contents data is completed, control section 17 stores the encrypted contents data in contents storage section 12 of storage section 11 (S46).

On the other hand, when the determination is made at step S44 that the encryption writing command is not received, selecting section 20 of control section 17 determines whether the encryption reading command is received from memory card control device 60 (S47). When the determination is made that the encryption reading command is received, selecting section 20 of control section 17 reads the target encrypted contents data from the region on contents storage section 12 indicated by the encryption reading command, and makes encrypting engine 16 decode the read encrypted contents data (S48). When the encrypted contents data is decoded, control section 17 transmits the decoded contents data to memory card control device 60 via interface 10 (S49).

1-3-4. Formatting Operation

Memory card 50 is formatted so that its state can be switched between the encryption recording mode and the non-encryption recording mode. Therefore, when the setting of memory card 50 is switched between the encryption recording mode and the non-encryption recording mode, data stored in a mode before switching is deleted in a software manner. The formatting operation of memory card 50 and various commands to be conditions of the formatting operation are described with reference to FIGS. 5 to 8.

Figure 7:
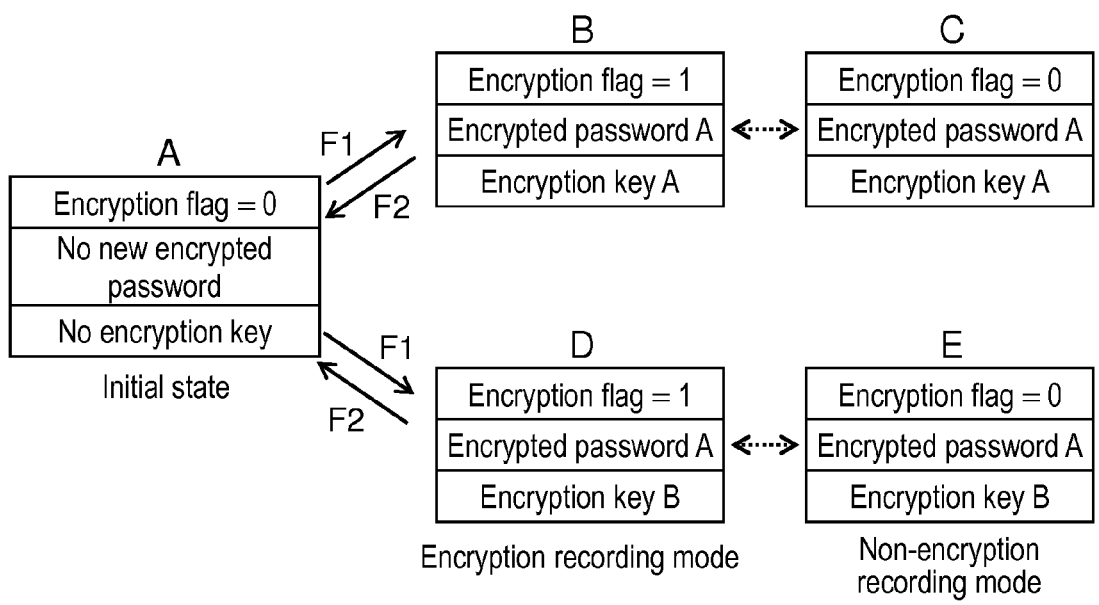
FIG. 7 is a state transition diagram for describing how a state of the memory card changes according to the change in the setting relating to the encryption of the memory card according to the first embodiment.
Figure 8:
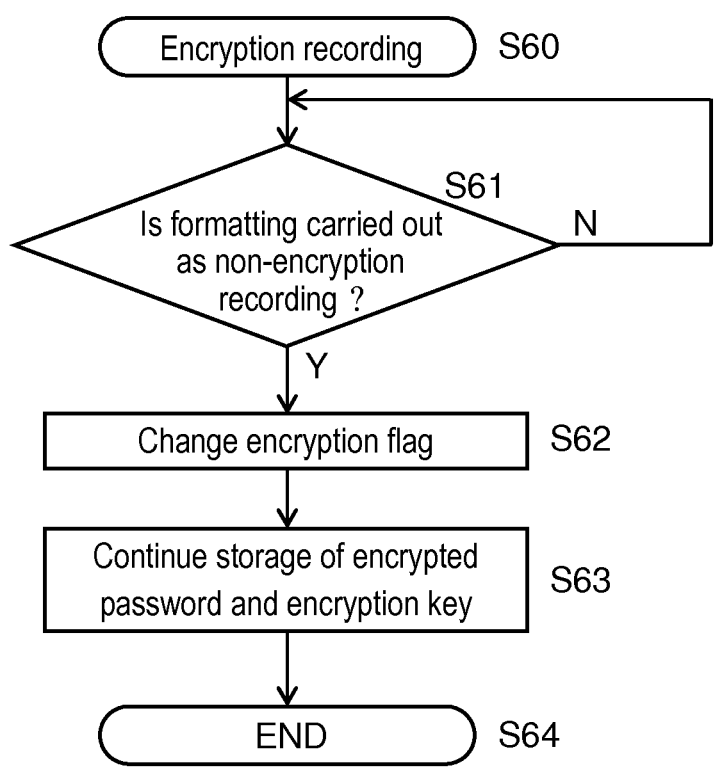
FIG. 8 is a flowchart for describing an operation for formatting the memory card according to the first embodiment.

FIG. 5 is a chart for describing types of commands issued by memory card control device 60 in order to change the setting of memory card 50. FIG. 6A and FIG. 6B are pattern diagrams for describing command constitutions for changing the setting of encrypted passwords in memory card 50. FIG. 7 is a state transition diagram for describing transition of the setting of memory card 50. FIG. 8 is a flowchart for describing a formatting operation for changing the setting of memory card 50 from the encryption recording mode into the non-encryption recording mode.

As shown in FIG. 5, in the system including memory card 50, two commands are prepared. The first command is an F1 command. The F1 command is a command for setting an encrypted password. The F1 command is, as shown in FIG. 6A, composed of a function ID expressed by 1 Byte and a password that is expressed by 16 Bytes and is newly set. The second command is an F2 command. The F2 command is a command for deleting an encrypted password that is already set. The F2 command is, as shown in FIG. 6B, composed of a function ID expressed by 1 Byte.

As shown in FIG. 7, in an initial state (state A), the encryption flag of memory card 50 is set to "0" indicating non-encryption mode. Further, in the initial state, both the encrypted password and the encryption key of memory card 50 are not set. In the initial state, memory card 50 does not encrypt data about FAT (File Allocation Table) and stores it in a predetermined region without encryption.

In the initial state, when the F1 command is received from memory card control device 60, the state of memory card 50 transits to the encryption recording mode such as state B or state D. That is to say, when the F1 command is received from memory card control device 60, control section 17 changes the encryption flag into "1" indicating the encryption recording mode and stores the encryption flag in format management section 13 of storage section 11. Further, control section 17 stores a new encrypted password included in the F1 command as the encrypted password into encrypted password registration section 15 of storage section 11. For example, when the state transits to state B or the state D, control section 17 stores encrypted password A as the encrypted password into encrypted password registration section 15 of storage section 11. Further, control section 17 newly generates data about FAT to be used for the encryption recording mode, allows encrypting engine 16 to encrypt the data about FAT, and controls storage section 11 so that the encrypted data about FAT is overwritten on unencrypted data about FAT and is stored.

Control section 17 randomly generates an encryption key to be linked to the set encrypted password, and stores the generated encryption key in encryption key management section 14 of storage section 11. For example, the state transits to state B, control section 17 generates encryption key A based on encrypted password A, and stores generated encryption key A as the encryption key into encryption key management section 14 of storage section 11. When the state transits to state D, control section 17 generates encryption key B based on encrypted password A, and stores generated encryption key B as the encryption key into encryption key management section 14 of storage section 11.

In state B and state D, contents of the encryption keys are different from each other. This is because even when the same encrypted password is set in memory card 50 in the initial state (state A), the encryption keys are randomly generated, and thus the encryption keys are not always the same. Therefore, in the initial state, even when the F1 command including encrypted password A is received from memory card control device 60, memory card 50 can transit into a plurality of states other than states B and D where contents of encryption keys are different.

In the encryption recording mode (state B, state D), when the F2 command is received from memory card control device 60, the state of memory card 50 again transits to the initial state (state A). That is to say, when the F2 command is received from memory card control device 60, control section 17 changes the encryption flag into "0" indicating the non-encryption mode, and stores the encryption flag in format management section 13 of storage section 11. Further, control section 17 deletes the encrypted password stored in encrypted password registration section 15 of storage section 11, and deletes the encryption key stored in encryption key management section 14 of storage section 11.

On the other hand, when an instruction for changing the encryption recording mode (state B, state D) into the non-encryption recording mode so as to carry out the formatting is received from memory card control device 60, the state of memory card 50 transits into the non-encryption recording mode such as state C or state E. That is to say, when a formatting instruction is received as the non-encryption recording mode from memory card control device 60, control section 17 changes the encryption flag into "0" indicating the non-encryption recording mode, and stores the encryption flag in format management section 13 of storage section 11. On the other hand, control section 17 allows encrypted password registration section 15 of storage section 11 to continue the storage of encrypted passwords, and allows encryption key management section 14 of storage section 11 to continue the storage of encryption key.

Not shown in FIG. 7, but when the F2 command is received from memory card control device 60 in the non-encryption recording mode (state C, state E), memory card 50 transits again to the initial state (state A). In this case, memory card 50 deletes the encrypted password and the encryption key. Thereafter, memory card 50 cannot recover data stored when the encryption recording mode is set.

The formatting operation for changing the set encryption recording mode into the non-encryption recording mode is described with reference to FIG. 8. When the instruction for changing the setting of the encryption recording mode (S60) into the non-encryption recording mode so as to carry out formatting is received (S61), control section 17 changes the encryption flag from "1" indicating the encryption recording mode into "0" indicating the non-encryption recording mode, and stores the changed encryption flag in format management section 13 of storage section 11 (S62). Although the encryption flag is changed, control section 17 makes storage section 11 continue the storage of the encrypted password stored in encrypted password registration section 15, and makes storage section 11 continue the storage of the encryption key stored in encryption key management section 14 (S63). As a result, memory card 50 that is set into the encryption recording mode is changed into the non-encryption recording mode, and the formatting operation is completed (S64).

Even when memory card 50 according to this embodiment is formatted by changing the setting from the encryption recording mode into the non-encryption recording mode, memory card 50 continues the storage of the encrypted password and the encryption key at a time when the encryption recording mode is set. As a result, even if memory card 50 is mistakenly formatted as the non-encryption recording mode, the user is likely to be capable of recovering encrypted contents data that is deleted later.

1-3-5. Operation for Recovering Encrypted Data

Figure 9:
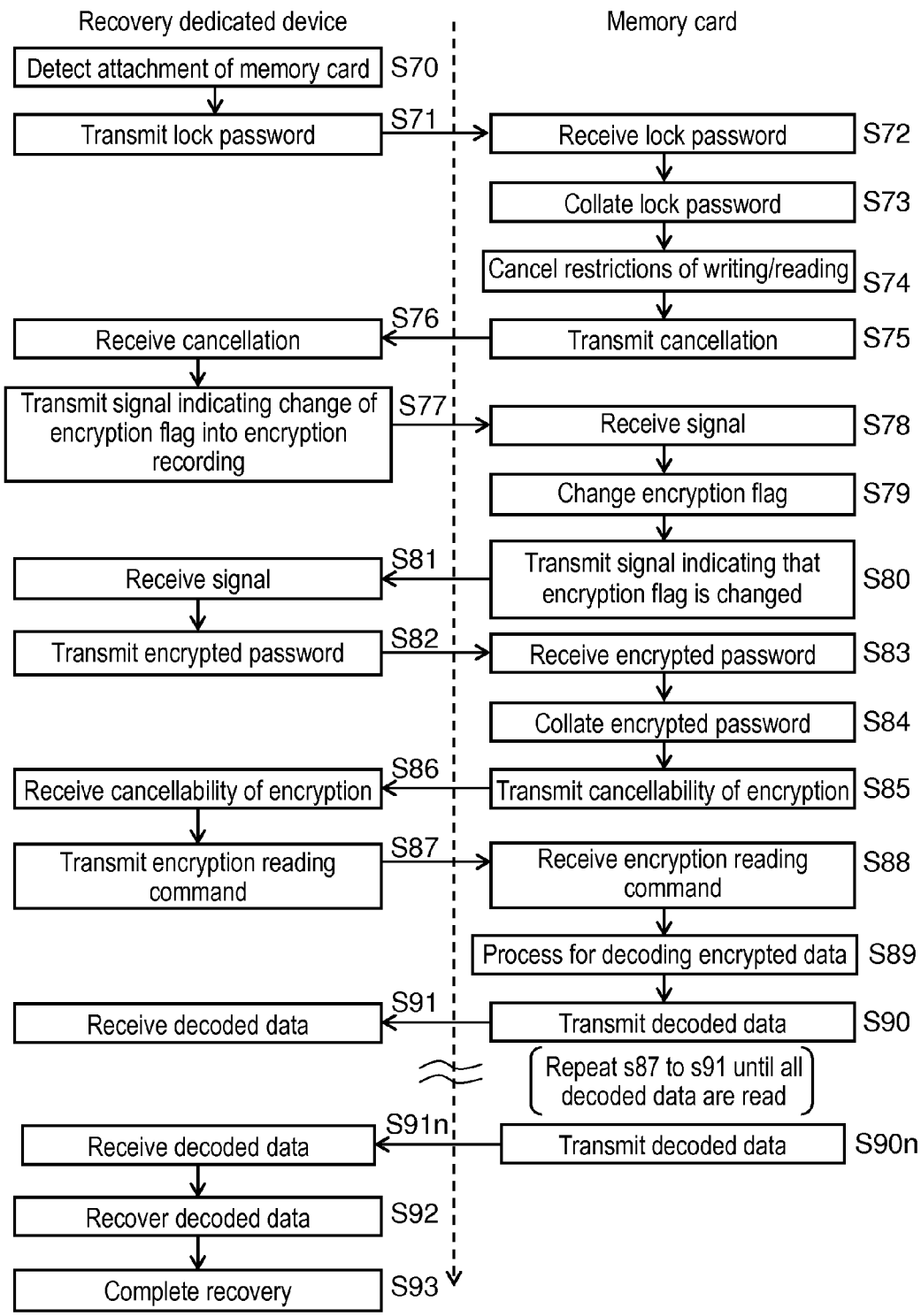
FIG. 9 is a flowchart for describing an operation for recovering data in the memory card according to the first embodiment.

Contents data is recovered by attaching memory card 50 to a recovery device. The recovery device may be memory card control device 60, or may be a device to be used exclusively for recovering contents data. A situation where the recovery device is memory card control device 60 is described here. The operation for recovering encrypted contents data is described with reference to FIG. 9. FIG. 9 is a flowchart for describing recovering encrypted contents data.

When memory card 50 is attached, control section 31 of memory card control device 60 as a recovery device detects the attachment of memory card 50 via interface 30 (S70). When the attachment of memory card 50 is detected, control section 31 reads a lock password set in memory card 50 from storage section 36, and transmits the read lock password to memory card 50 via interface 30 (S71).

Steps S73 to step S75 in an operation after the reception of the lock password (S72) are the same as steps S17 to S19 in the initial operation at a time when memory card 50 is attached to memory card control device 60 in a normal state other than the recovery of contents data shown in FIG. 2. Therefore, description about steps S73 to S75 is omitted.

When a response indicating that restrictions are canceled via interface 30 is received (S76), control section 31 transmits a mode change signal for instructing the encryption flag of memory card 50 to be changed from "0" indicating the non-encryption recording mode into "1" indicating the encryption recording mode to memory card 50 (S77).

When the mode change signal is received via interface 10 (S78), control section 17 changes the encryption flag stored in format management section 13 of storage section 11 from "0" into "1" (S79). When the encryption flag is changed, control section 17 transmits a signal indicating that the encryption flag is changed to memory card control device 60 via interface 10 (S80).

When the signal is received via interface 30 (S81), control section 31 transmits an encrypted password input via password input section 35 to memory card 50 via interface 30 (S82). An encrypted password to be input is an encrypted password that is set when memory card 50 is set into the encryption recording mode before formatting.

When an encrypted password is received via interface 10 (S83), password collation section 18 of control section 17 collates the received encrypted password with the encrypted password stored in encrypted password registration section 15 of storage section 11 (S84). When after the formatting into the non-encryption recording mode is completed, various data are stored in memory card 50, a situation such that the encrypted password is already overwritten with another data is considered. In such a case, the collation of an encrypted password cannot be carried out. Therefore, in such a case, the user cannot recover contents data after the formatting into the non-encryption recording mode.

When the collation of the encrypted passwords succeeds at step S84, control section 17 transmits a signal indicating that encrypted contents data can be decoded (S85).

When the signal is received via interface 30 (S86), control section 31 transmits the encryption reading command to memory card 50 via interface 30 (S87) in order to read the encrypted contents data from memory card 50. Control section 31 transmits the encryption reading command for reading encrypted contents data, and does not transmit the encryption reading command for reading the data about FAT. This is because the data about FAT stored in memory card 50 is overwritten with data used in the non-encryption recording mode at a time point when the formatting into the non-encryption recording mode is completed.

When the encryption reading command is received via interface 10 (S88), control section 17 reads encrypted contents data from contents storage section 12 of storage section 11, and allows encrypting engine 16 to execute a decoding process (S89). When the decoding process is completed, control section 17 transmits the decoded contents data to memory card control device 60 via interface 10 (S90). Control section 31 receives the decoded contents data via interface 30, and stores the received contents data in storage section 36 (S91). Memory card control device 60 repeats a process for transmitting the encryption reading command to memory card 50 and receiving encrypted contents data from memory card 50 (S87 to S91) until all encrypted contents data stored in memory card 50 are read.

When all the encrypted contents data stored in memory card 50 are received (S91n), control section 31 recovers all the decoded contents data (S92). For example, control section 31 detects data indicating a file header in the decoded contents data, and searches the data composing the file based on the detected data, or in a case of a file of compressed image data, shuffles a data order in a predetermined block unit and repeatedly decodes the data until decoding of compressed image data succeeds so as to decode the contents data. When the recovery of the contents data is completed, the operation for recovering encrypted contents data in memory card 50 is completed (S93).

After the setting of memory card 50 is changed from the encryption recording mode into the non-encryption recording mode, the user of memory card 50 according to the embodiment occasionally recovers encrypted contents data stored in memory card 50 before the setting is changed. This is because even if memory card 50 is changed from the encryption recording mode into the non-encryption recording mode, it does not delete an encryption key.

1-4. Effects

Memory card 50 according to the embodiment has interface 10, storage section 11, encrypting engine 16, and control section 17. Interface 10 accepts the setting into any one of the encryption recording mode for encrypting and recording contents data and the non-encryption recording mode for non-encrypting and recording contents data. Storage section 11 stores contents data, and an encryption flag indicating the setting of the encryption recording mode or the non-encryption recording mode. When the encryption recording mode is set, encrypting engine 16 encrypts contents data using an encryption key. When the encryption recording mode is set, control section 17 controls storage section 11 so that storage section 11 stores the encryption key and the encrypted contents data. Further, when the setting is changed from the encryption recording mode into the non-encryption recording mode, control section 17 controls storage section 11 so that the encryption flag is changed into the setting of the non-encryption recording mode with the continuous storage of the encryption key.

With such a constitution, even if memory card 50 is mistakenly changed into the non-encryption recording mode and deletes necessary contents data, the user is likely to be capable of recovering the deleted encrypted contents data later.

In memory card 50 according to the embodiment, control section 17 may control storage section 11 so that storage section 11 further stores a password for encryption related to the encryption key. When the setting is changed from the encryption recording mode into the non-encryption recording mode, control section 17 may control storage section 11 so that the encryption flag is changed to indicate the non-encryption recording mode with the continuous storage of the encryption key and the password for encryption related to the encryption key.

With such a constitution, even if memory card 50 is mistakenly changed into the non-encryption recording mode and deletes necessary contents data, the user is likely to be capable of recovering the deleted encrypted contents data later as long as the encrypted password is stored.

Interface 10 in memory card 50 according to the embodiment may receive a password from an outside. Control section 17 may further control storage section 11 so that it stores a lock password in advance. At least when the encryption recording mode is set, control section 17 does not permit writing and reading of contents data into/from storage section 11 until interface 10 receives a password and determines that the received password matches with the lock password stored in storage section 11.

With such a constitution, even if an external device that cannot recognize that the encrypted contents data is stored in memory card 50 transmits the contents data reading command to memory card 50, the encrypted contents data is not read into the external device. This can obviate an out-of-control situation such that the external device treats encrypted contents data as unencrypted contents data.

Second Exemplary Embodiment

A second embodiment is described below with reference to FIGS. 10 to 15. Contents of the program executed by control section 17 according to the first embodiment and contents of the program executed by control section 31 are different in the second embodiment. However, physical constitutions are nearly identical to each other in the second embodiment and the first embodiment. Therefore, each constitution in the second embodiment is identical to that in FIG. 1, and like reference symbols are used.

2-1. Outline

In the system including memory card 50 according to the embodiment, differently from the system including memory card 50 according to the first embodiment, when the setting is changed from the encryption recording mode into the non-encryption recording mode, storage of an encryption key at the time when the encryption recording mode is set is continued, but an encrypted password that is related to the encryption key and is stored is changed to be stored.

As a result, when the setting is changed from the encryption recording mode into the non-encryption recording mode, the encrypted password at the time when the encryption recording mode is set is deleted from memory card 50. As a result, when memory card 50 set into the non-encryption recording mode is lent to another person, the user can find a reduced likelihood of disclosing the encrypted password at the time of the encryption recording mode to other people.

2-2. Operation

An operation of the system including memory card 50 according to the embodiment is described with reference to FIGS. 10 to 15. The operation different from the first embodiment is particularly described.

2-2-1. Operation for Changing Encrypted Password

The system including memory card 50 according to the embodiment can change the encrypted password of memory card 50. For example, the user changes the encrypted password of memory card 50 so as to be capable of lending it to another person. As a result, the user can allow another person to user memory card 50 without letting another person know the encrypted password that is always used. The operation for changing an encrypted password in memory card 50 and various commands as conditions before the operation for changing an encrypted password are described with reference to FIG. 10 to FIG. 13.

Figure 11A:
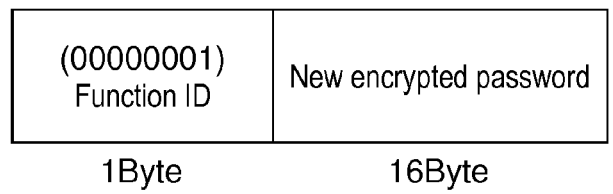
FIG. 11A is a pattern diagram illustrating a command constitution for changing the setting of the encrypted password in the memory card according to the second embodiment.
Figure 11B:
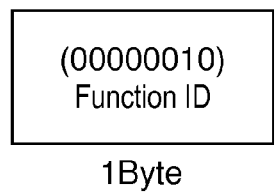
FIG. 11B is a pattern diagram illustrating a command constitution for changing the setting of the encrypted password in the memory card according to the second embodiment.
Figure 11C:
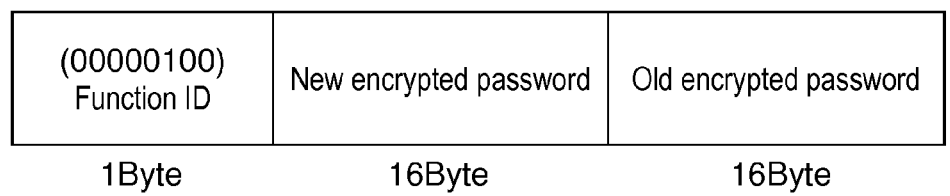
FIG. 11C is a pattern diagram illustrating a command constitution for changing the setting of the encrypted password in the memory card according to the second embodiment.
Figure 12:
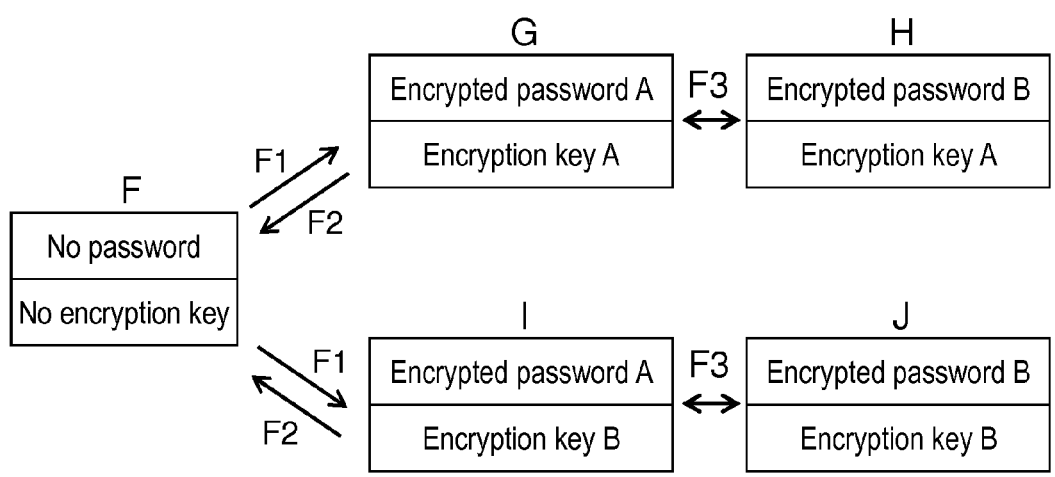
FIG. 12 is a state transition diagram for describing how the state of the memory card changes according to the change in the encrypted password in the memory card according to the second embodiment.
Figure 13:
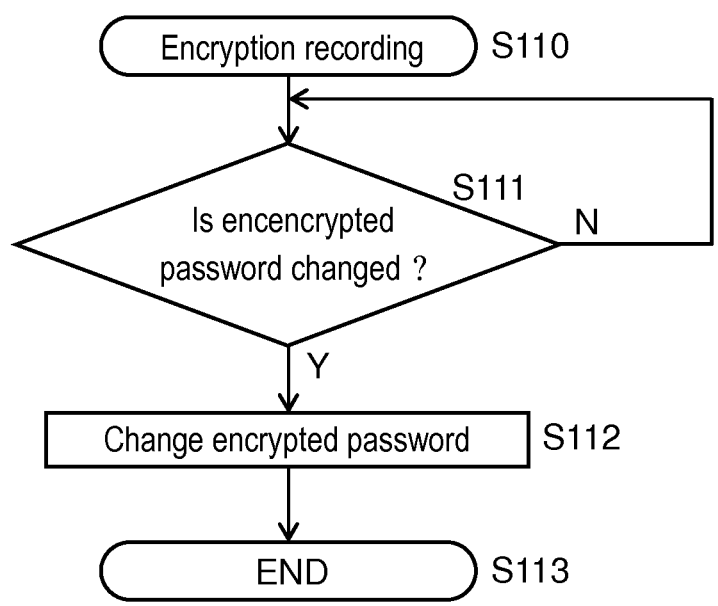
FIG. 13 is a flowchart for describing an operation for changing the encrypted password in the memory card according to the second embodiment.

FIG. 10 is a chart for describing types of commands issued by memory card control device 60 in order to change the setting of memory card 50. FIGS. 11A, 11B, and 11C are pattern diagrams for describing constitutions of commands issued by memory card control device 60 in order to change the setting of memory card 50. FIG. 12 is state transition diagram for describing the state transition relating to the encrypted password of memory card 50. FIG. 13 is a flowchart for describing an operation at the time when the encrypted password of memory card 50 is changed.

As shown in FIG. 10, in the system including memory card 50 according to the embodiment, three commands are prepared. A difference from the first embodiment is a point that an F3 command is prepared as the third command. The F3 command is a command for changing the encrypted password set in memory card 50. The F3 command is composed of, as shown in FIG. 11C, an function ID expressed by 1 Byte, an encrypted password (new encrypted password) that is expressed by 16 Bytes and is newly set, and an encrypted password (old encrypted password) that is expressed by 16 Bytes and is currently set.

As shown in FIG. 12, in the initial state (state F), both an encryption key of memory card 50 and an encrypted password linked to the encryption key are not set. In the initial state, when the F1 command is received from memory card control device 60, the state of memory card 50 transits to a state such as state G or state I. That is to say, when the F1 command is received from memory card control device 60, control section 17 stores an encrypted password specified by the user as an encrypted password into encrypted password registration section 15 of storage section 11. In an example of FIG. 12, encrypted password A is stored as the encrypted password. Control section 17 generates an encryption key based on the encrypted password specified by the user, and relates the generated encryption key with the encrypted password so as to store them in encryption key management section 14 of storage section 11. In the example of FIG. 12, encryption key A or encryption key B is stored as the encryption key.

In state G or state I, the F3 command is received from memory card control device 60, the state of memory card 50 transits to state H or state J. That is to say, control section 17 continues the storage of the encryption key stored in encryption key management section 14 of storage section 11, and changes only an encrypted password to be linked to the encryption key. In the example of FIG. 12, the encrypted password is changed from encrypted password A into encrypted password B. In state H, encrypted password B that is a new encrypted password is linked to encryption key A. In state J, encrypted password B that is a new encrypted password is linked to encryption key B. Encrypted password B is a new encrypted password included in the F3 command.

In such a manner, the system including memory card 50 according to the embodiment can change the encrypted password of memory card 50. As a result, the user changes an encrypted password before memory card 50 is lent to other people so as to be capable of reducing a fear that an encrypted password that is frequently used is known among other people.

2-2-2. Formatting Operation

Similarly to the first embodiment, memory card 50 is formatted so as to be switched between the encryption recording mode and the non-encryption recording mode. When the setting of memory card 50 according to the embodiment is changed from the encryption recording mode into the non-encryption recording mode so as to be formatted, the stored encrypted password is changed into a predetermined password. As a result, a person in charge who recovers encrypted contents data later inputs the predetermined password so as to be capable of decoding the encrypted contents data. Further, a likelihood such that even when memory card 50 is set into the non-encryption recording mode, an encrypted password frequently used remains in memory card 50 and is known among other people can be reduced. The formatting operation of memory card 50 according to the embodiment is described below with reference to FIGS. 14 and 15.

Figure 14:
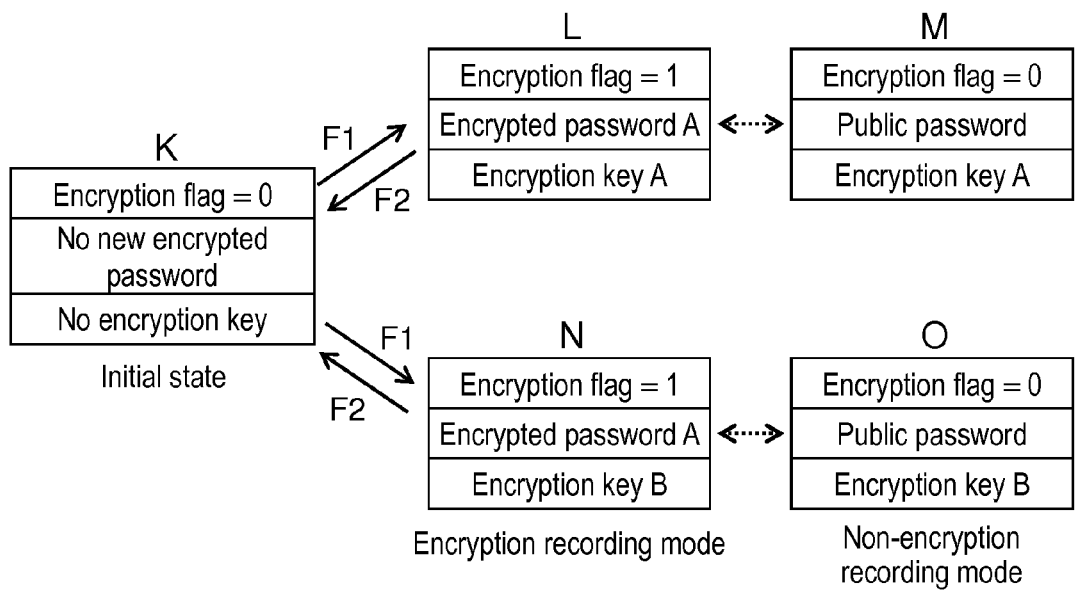
FIG. 14 is a state transition diagram for describing how the state of the memory card changes according to the change in the setting relating to the encryption of the memory card according to the second embodiment.
Figure 15:
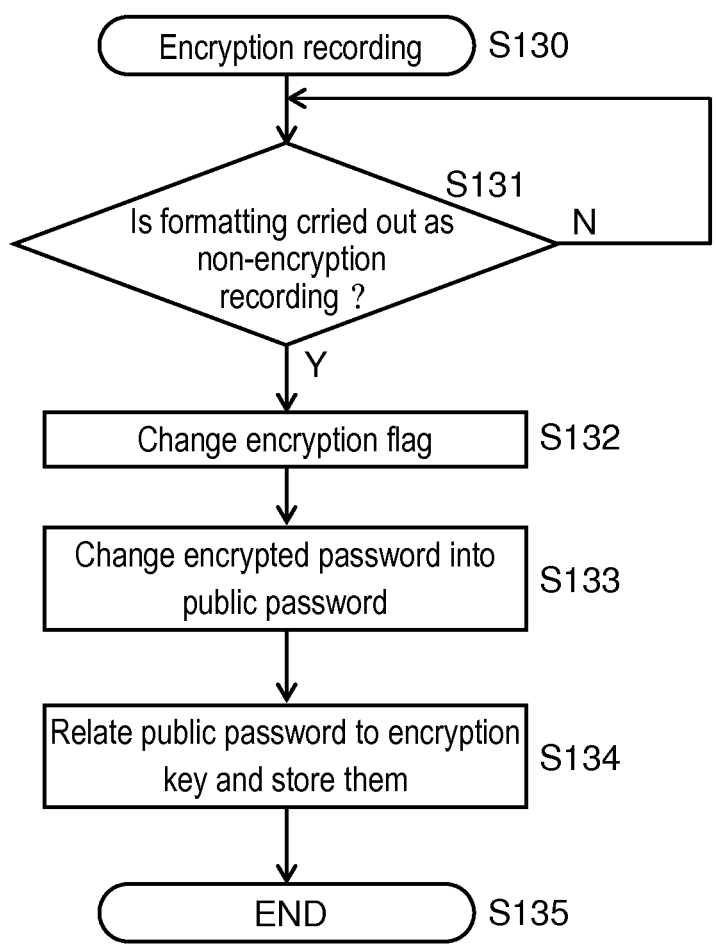
FIG. 15 is a flowchart for describing an operation for formatting the memory card according to the second embodiment.

FIG. 14 is a state transition diagram for describing the setting transition of memory card 50. FIG. 15 is a flowchart for describing the formatting operation for changing the setting of memory card 50 from the encryption recording mode into the non-encryption recording mode.

The initial state (state K) and the encryption recording mode (state L, state N) are the same as the initial state (state A) and the encryption recording mode (state B, state D) shown in FIG. 7 in the first embodiment. Therefore, description about these states is omitted.

In the encryption recording mode (state L, state N), when an instruction for changing the state into the non-encryption recording mode to carry out the formatting is received from memory card control device 60, the state of memory card 50 transits to the non-encryption recording mode such as state M and state O. That is to say, when a formatting instruction is received as the non-encryption recording mode from memory card control device 60, control section 17 changes the encryption flag into "0" indicating the non-encryption recording mode, and stores the encryption flag in format management section 13 of storage section 11. Control section 17 changes the encrypted password from encrypted password A into a public password so as to be stored in encrypted password registration section 15 of storage section 11. The public password is a predetermined encrypted password, and is an encrypted password that is always set when memory card 50 is set into the non-encryption recording mode. The public password can be a password for the non-encryption recording mode. On the other hand, control section 17 maintains the storage of the encryption key in encryption key management section 14 of storage section 11. Control section 17 controls storage section 11 so that the encryption key is related to the public password and is stored.

The formatting operation for changing the set encryption recording mode into the non-encryption recording mode is described with reference to FIG. 15. When the state is set as the encryption recording mode (S130), if the formatting instruction to change the set mode into the non-encryption recording mode is received (S131), control section 17 changes the encryption flag from "1" indicating the encryption recording mode into "0" indicating the non-encryption recording mode, and stores the changed encryption flag in format management section 13 of storage section 11 (S132). When the encryption flag is changed, control section 17 changes the encrypted password into the public password (S133) and relates the encryption key stored when the encryption recording mode is set to the public password so as to store the key and the password in storage section 11 (S134). As a result, memory card 50 that is set into the encryption recording mode is changed into the non-encryption recording mode, and the formatting operation is completed (S135).

In such a manner, when the setting of memory card 50 according to the embodiment is changed from the encryption recording mode into the non-encryption recording mode and memory card 50 is formatted, the encryption key is not particularly changed and the storage continues, but the encrypted password is changed into the public password. As a result, when memory card 50 set into the non-encryption recording mode is lent to another person, the user can find a reduced likelihood of disclosing the encrypted password set at the time of the encryption recording mode to other people.

2-3. Effects

Memory card 50 according to the embodiment has interface 10, storage section 11, encrypting engine 16 and control section 17. Interface 10 accepts the setting into any one of the encryption recording mode for encrypting and recording contents data and the non-encryption recording mode for non-encrypting and recording contents data. Storage section 11 stores contents data, and an encryption flag indicating the setting of the encryption recording mode or the non-encryption recording mode. When the encryption recording mode is set, encrypting engine 16 encrypts contents data using an encryption key. When the encryption recording mode is set, control section 17 controls storage section 11 so that storage section 11 stores the encryption key and the encrypted contents data. When the setting is changed from the encryption recording mode into the non-encryption recording mode, control section 17 changes a password for encryption into a predetermined password for non-encryption in the state that the storage of the encryption key continues, and controls storage section 11 so that the encryption flag is changed to indicate the non-encryption recording mode.

With such a constitution, when memory card 50 is changed from the encryption recording mode into the non-encryption recording mode, the encrypted password stored in the encryption recording mode is changed. As a result, the user can find a reduced likelihood of disclosing the encrypted password set at the time of the encryption recording mode to other people even when memory card 50 set into the non-encryption recording mode is lent to another person.

Another Exemplary Embodiment

The first and second embodiments are described as illustration of the technique disclosed in this application. However, the technique of the present invention is not limited to them, and can be applied also to embodiments where changes, replacements, addition and omissions are suitably made.

Therefore, another embodiment is illustrated below.

The first and second embodiments illustrate memory card 50 as a portable recording medium. However, the present invention is not always limited to such an example. For example, the portable recording medium may be an external hard disc drive or an external flash memory. In short, any recording medium may be used as long as it is detachable from a device.

Further, the first and second embodiments illustrate interface 10 as the interface of memory card 50. However, the present invention is not always limited to such an example. For example, as an interface, a communication module such as a wireless LAN module may be used. In this case, memory card 50 accepts the setting to any one of the encryption recording mode and the non-encryption recording mode from the outside via a wireless LAN. In short, the interface may have any constitution as long as it can accept the setting to any one of the encryption recording mode and the non-encryption recording mode from the outside.

Further, in the first and second embodiments, control section 17 is composed of one semiconductor chip. However, the present invention is not always limited to such an example. For example, control section 17 may be composed of a plurality of semiconductor chips.

In the first and second embodiments, memory card control device 60 determines whether the encryption command or the non-encryption command is transmitted. However, the present invention is not always limited to such a constitution. Control section 17 may switch the setting as to whether contents data is encrypted or not with reference to the encryption flag stored in format management section 13.

In the first and second embodiments, memory card 50 manages the lock password and the encryption flag. However, the present invention is not always limited to such an example. For example, when memory card 50 is set into the encryption recording mode, a lock password is set, and when memory card 50 is set into non-encryption recording mode, the lock password is unset. In such a constitution, the encryption flag and the lock password can be commonly used. In this case, when the lock password is valid, memory card 50 is set into the encryption recording mode, and when the lock password is invalid, memory card 50 is set into the non-encryption recording mode.

Further, in the first and second embodiments, when memory card 50 is set into the encryption recording mode, the user inputs an encrypted password via memory card control device 60. However, the present invention does not always have to have such a constitution. For example, only the encryption key may be stored in memory card 50, and the user may directly input an encryption key via memory card control device 60.

The embodiments are described above as the examples of the technique in the present invention. In order to describe the embodiment, the accompanying drawings and the detailed description are provided.

Therefore, the components described in the accompanying drawings and the detailed description include not only essential components for solving the problems but also components unessential for solving the problems in order to illustrate the above technique. For this reason, although these unessential components are described in the accompanying drawings and the detailed description, these unessential components should not be approved as being essential.

Further, since the above embodiments are for illustrating the technique of the present invention, various changes, replacements, additions and omissions can be carried out within the scope of claims and an equivalent scope.

What is claimed is:

1. A portable recording medium comprising:
   an interface for accepting setting into any one of an encryption recording mode for encrypting and recording contents data, and a non-encryption recording mode for non-encrypting and recording contents data;
   a hardware storage section configured to store storing the contents data, an encryption key, and an encryption flag indicating whether any one of the encryption recording mode and the non-encryption recording mode is set;
   an encrypting engine for, when the encryption recording mode is set, encrypting the contents data using the encryption key; and
   a control section for, when the encryption recording mode is set, controlling the storage section so that the encryption key and the encrypted contents data are stored,
   wherein, when the setting is changed from the encryption recording mode into the non-encryption recording mode, a format operation is performed such that the contents data stored in the storage section under the encryption recording mode is deleted in a software manner but the encryption key is not deleted, the encryption flag is changed to indicate the setting of the non-encryption recording mode with continuous storage of the encryption key, and the encryption key is maintained in a usable state after the format operation is performed so that the deleted content data can be recovered with the maintained encryption key.

2. The portable recording medium according to claim 1, wherein the control section further controls the storage section so that a password for encryption related to the encryption key is stored.

3. The portable recording medium according to claim 2, wherein the control section controls the storage section so that when the setting is changed from the encryption recording mode into the non-encryption recording mode, the password for encryption is changed into a predetermined password for non-encryption with the continuous storage of the encryption key, and the encryption flag is changed to indicate the non-encryption recording mode.

4. The portable recording medium according to claim 1, wherein the interface receives a password from an outside,
   at least when the encryption recording mode is set,
   the control section controls the storage section so that a lock password is stored in advance,
   and does not permit writing and reading of the contents data into/from the storage section until the interface receives the password and the received password is determined as matching with the lock password stored in the storage section.

5. A system including a portable recording medium and a control device to which the portable recording medium is attachable,
   wherein the control device has an interface on a side of the control device for sending a signal for instructing the portable recording medium to set the portable recording medium into any one of an encryption recording mode for encrypting and recording contents data and a non-encryption recording mode for non-encrypting and recording contents data,
   the portable recording medium comprises:
   an interface on a side of the portable recording medium for accepting the instruction for setting into any one of the encryption recording mode for encrypting and recording contents data and the non-encryption recording mode for recording the contents data as a plain text via the interface on the side of the control device;

a storage section on the side of the portable recording medium for storing the contents data, an encryption key, and an encryption flag indicating any one of the encryption recording mode and the non-encryption recording mode;

an encrypting engine for, when the encryption recording mode is set, encrypting the contents data using the encryption key; and a control section for controlling the storage section on the side of the portable recording medium so that the encryption key and the encrypted contents data are stored when the encryption recording mode is set, a format operation is performed such that the contents data stored in the storage section on the side of the portable recording medium under the encryption recording mode is deleted in a software manner but the encryption key is not deleted, the encryption flag is changed to indicate the setting of the non-encryption recording mode with the continuous storage of the encryption key and the encryption key is maintained in a usable state after the format operation is performed so that the deleted content data can be recovered with the maintained encryption key, when the interface on the side of the portable recording medium accepts the signal for instructing a change of the setting from the encryption recording mode into the non-encryption recording mode via the interface on the side of the control device.

6. The system including the portable recording medium according to claim 5, wherein in the portable recording medium, the control section further controls the storage section on the side of the portable recording medium so that a password for encryption related to the encryption key is stored.

7. The system including the portable recording medium according to claim 6, wherein in the portable recording medium, the control section controls the storage section on the side of the portable recording medium so that the password for encryption is changed into a predetermined password for non-encryption and the encryption flag is changed to indicate the setting into the non-encryption recording mode with the continuous storage of the encryption key when the interface on the side of the portable recording medium accepts the signal for instructing the change from the encryption recording mode into the non-encryption recording mode via the interface on the side of the control device.

8. The system including the portable recording medium according to claim 5, wherein the control device further has a storage section on the side of the control device for storing a password, at least when the encryption recording mode is set, in the control device, the interface on the side of the control device notifies the portable recording medium of the password, in the portable recording medium, the interface on the side of the portable recording medium accepts the password from the control device, the control section further controls the storage section on the side of the portable recording medium so that a lock password is stored in advance, and does not permit writing and reading of contents data into/from the storage section on the side of the portable recording medium until the interface accepts the password and determines that the accepted password matches with the lock password stored in the storage section on the side of the portable recording medium.

9. A data recovery method for a non-transitory portable recording medium, the non-transitory portable recording medium storing an encryption flag indicating setting into any one of an encryption recording mode for encrypting and recording contents data and a non-encryption recording mode for non-encrypting and recording contents data, an encryption key, and the contents data encrypted by using the encryption key, wherein in the non-transitory portable recording medium where the encryption flag indicates that the non-encryption recording mode is set, the encryption flag is changed so as to indicate that the encryption recording mode is set, the encrypted contents data is decoded by using the encryption key in the non-transitory portable recording medium where the encryption flag is changed to indicate that the encryption recording mode is set, and wherein when the setting is changed from the encryption recording mode into the non-encryption recording mode, a format operation is performed such that the contents data stored in the non-transitory portable recording medium under the encryption recording mode is deleted in a software manner but the encryption key is not deleted, the encryption flag is changed to indicate the setting of the non-encryption recording mode with continuous storage of the encryption key and the encryption key is maintained in a usable state after the format operation is performed so that the deleted content data can be recovered with the maintained encryption key.

10. A portable recording medium comprising:

an interface for accepting setting into any one of an encryption recording mode for encrypting and recording contents data, and a non-encryption recording mode for non-encrypting and recording contents data;

a hardware storage section configured to store the contents data, an encryption key, and an encryption flag indicating whether any one of the encryption recording mode and the non-encryption recording mode is set;

an encrypting engine for, when the encryption recording mode is set, encrypting the contents data using the encryption key; and a control section for, when the encryption recording mode is set, controlling the storage section so that the encryption key and the encrypted contents data are stored, wherein when the setting is changed from the encryption recording mode into the non-encryption recording mode, a format operation is performed such that the contents data stored in the storage section under the encryption recording mode is deleted in a software manner but the encryption key is not deleted, and the encryption flag is changed to indicate the setting of the non-encryption recording mode with continuous storage of the encryption key, and wherein the control section further controls the storage section so that a password for encryption related to the encryption key is stored, the control section controls the storage section when the setting is changed from the encryption recording mode into the non-encryption recording mode, with the continuous storage of the encryption key so that the encryption key remains in a usable state after the format operation is performed so that the deleted content data can be recovered with the maintained encryption key, and the encryption flag is changed to indicate the non-encryption recording mode.

11. The portable recording medium according to claim 10, wherein when the setting is changed from the encryption recording mode into the non-encryption recording mode, the control section controls the storage section so that the password for encryption is changed into a predetermined password for non-encryption, and the predetermined password is not a default value.

* * * * *